April 25, 1933.  G. A. LUTZ ET AL  1,905,480
MEANS FOR ELECTRIC WELDING
Filed Dec. 1, 1930  5 Sheets-Sheet 1
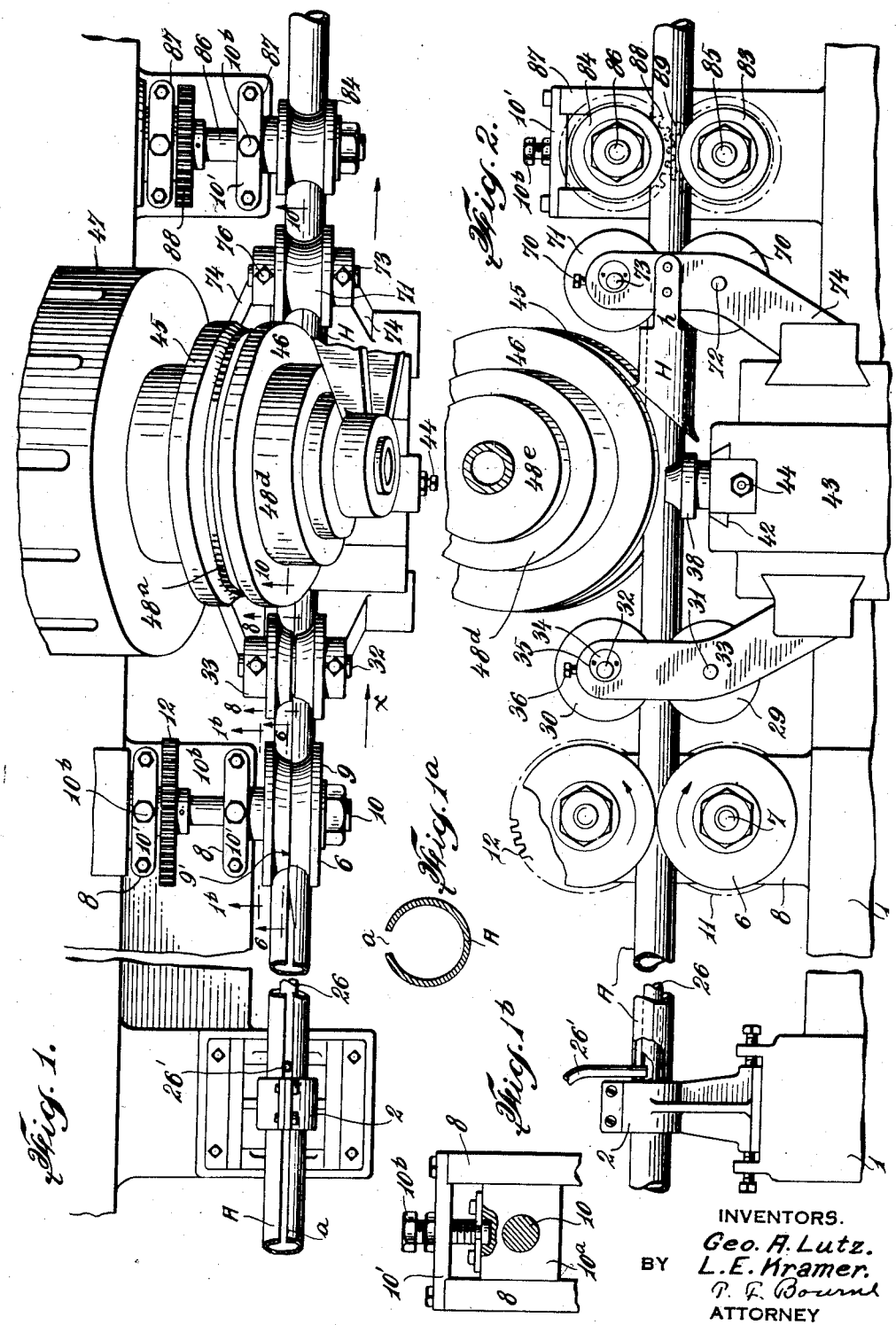
INVENTORS.
Geo. A. Lutz.
L. E. Kramer.
BY P. F. Bourne
ATTORNEY

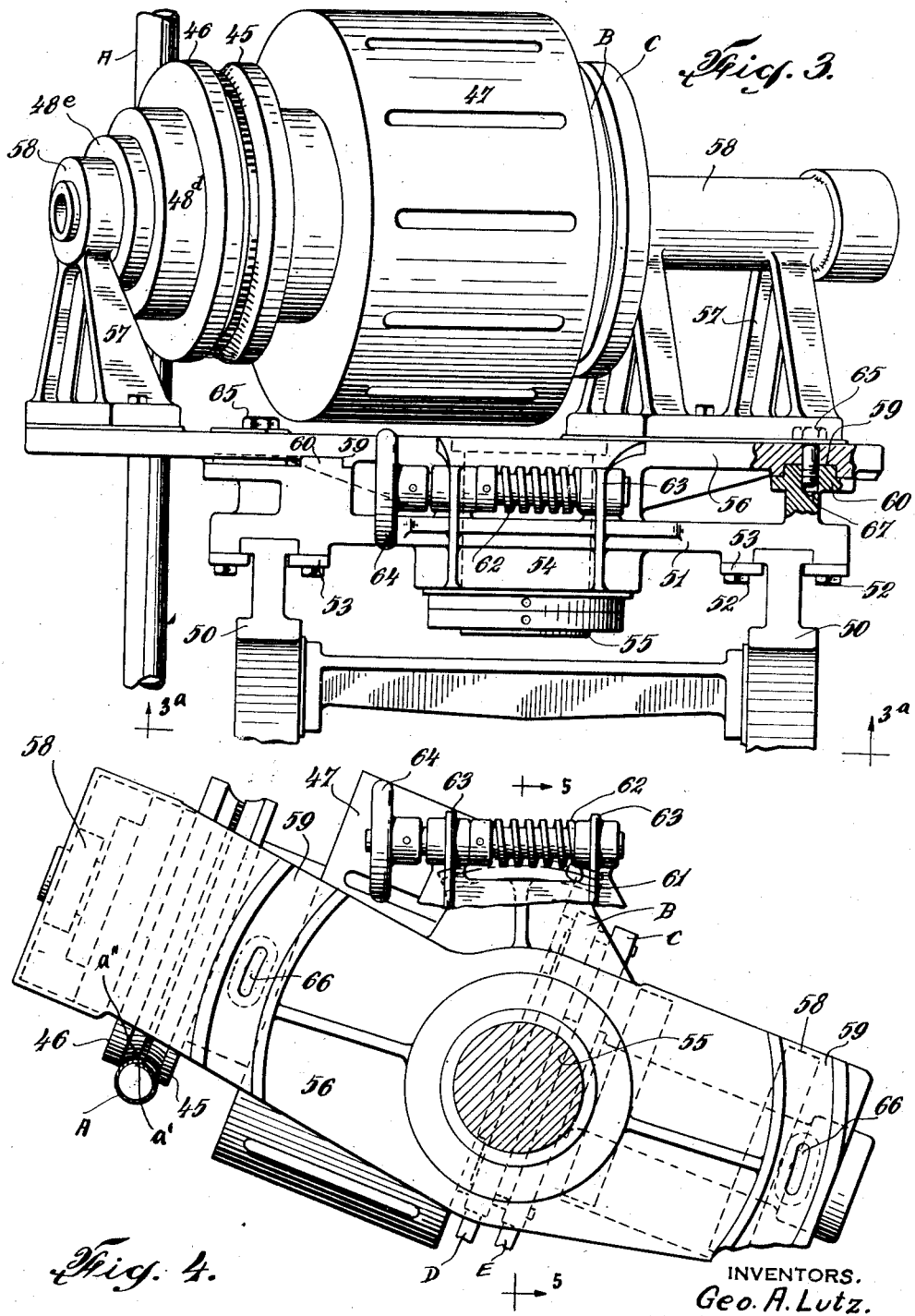

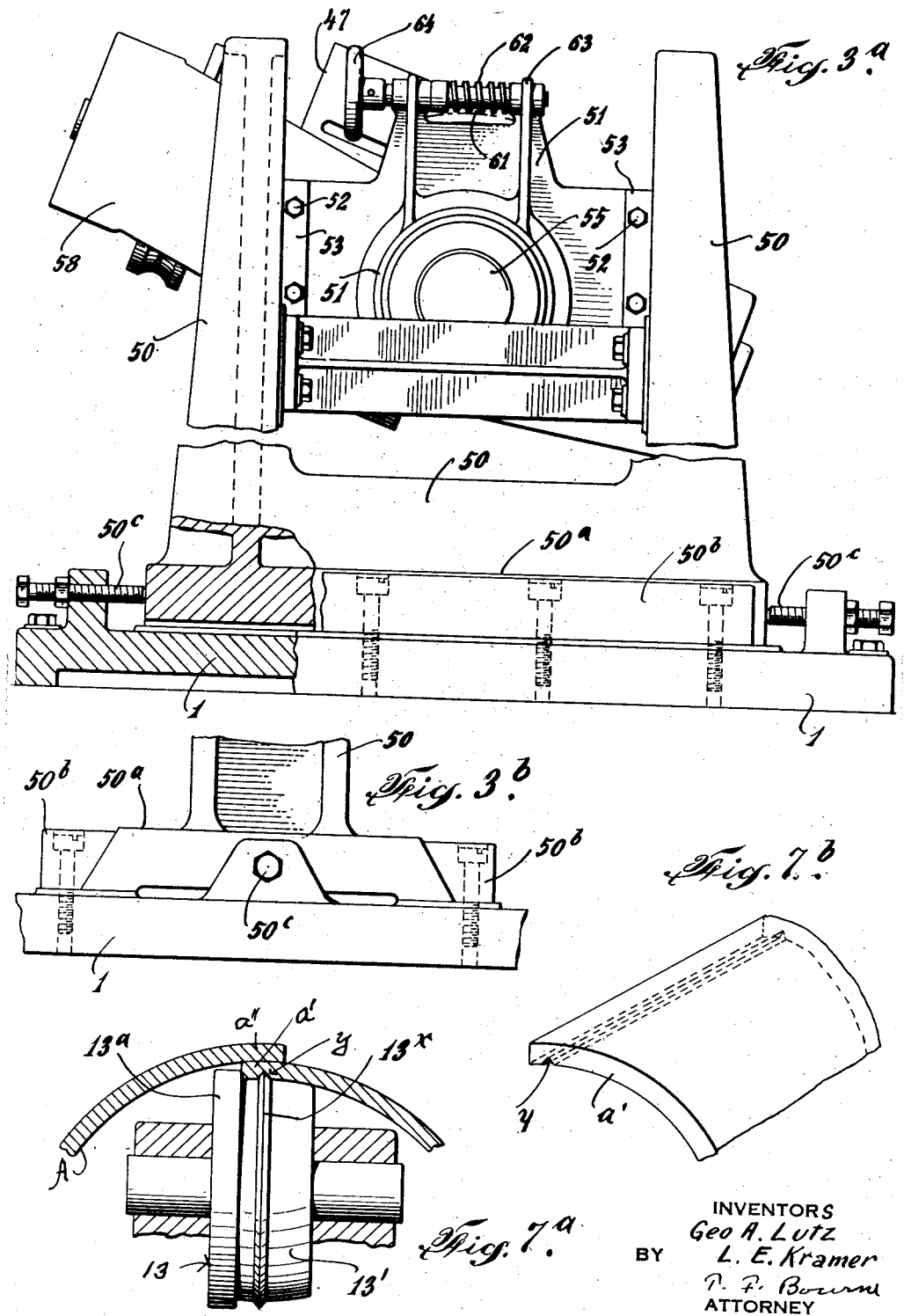

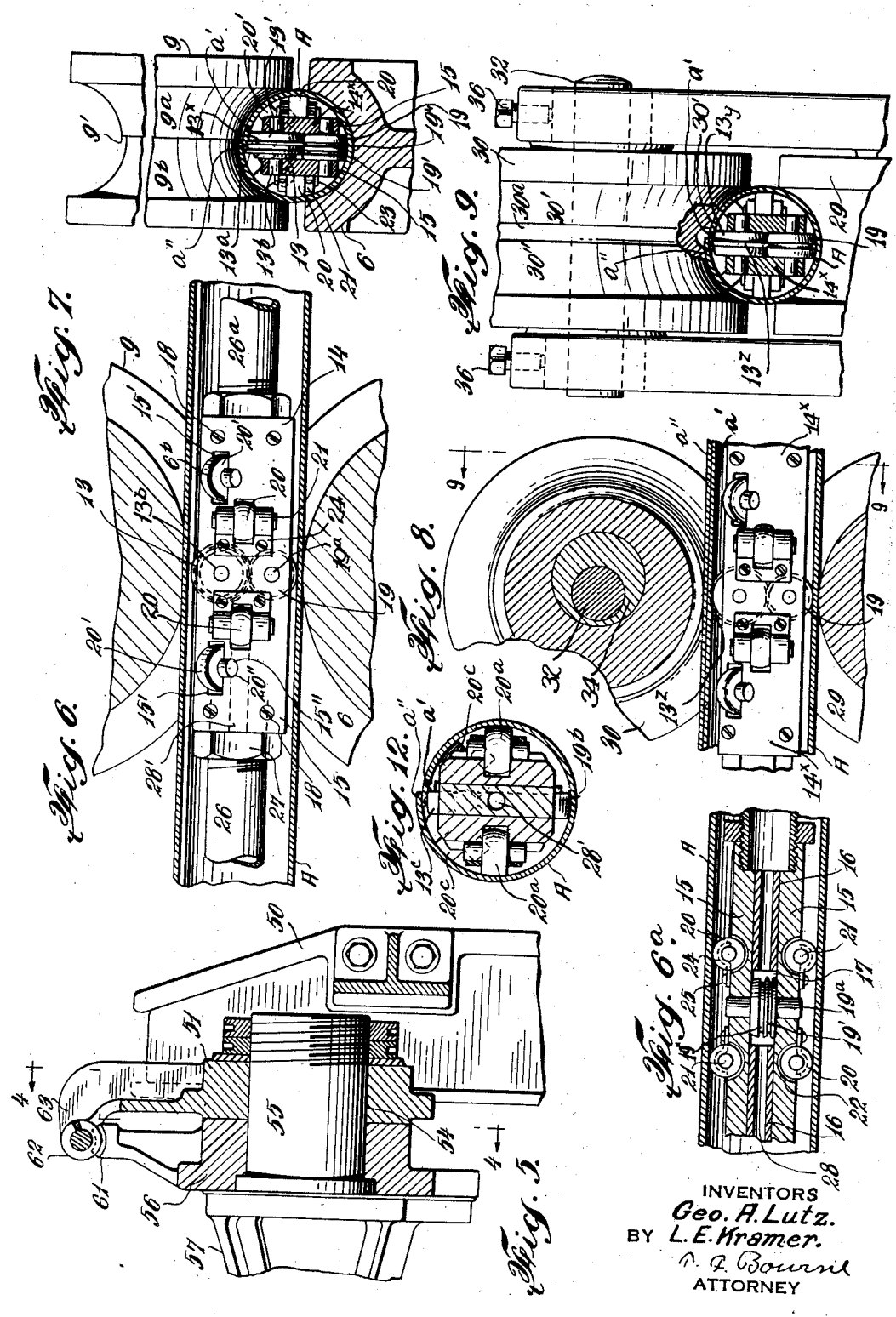

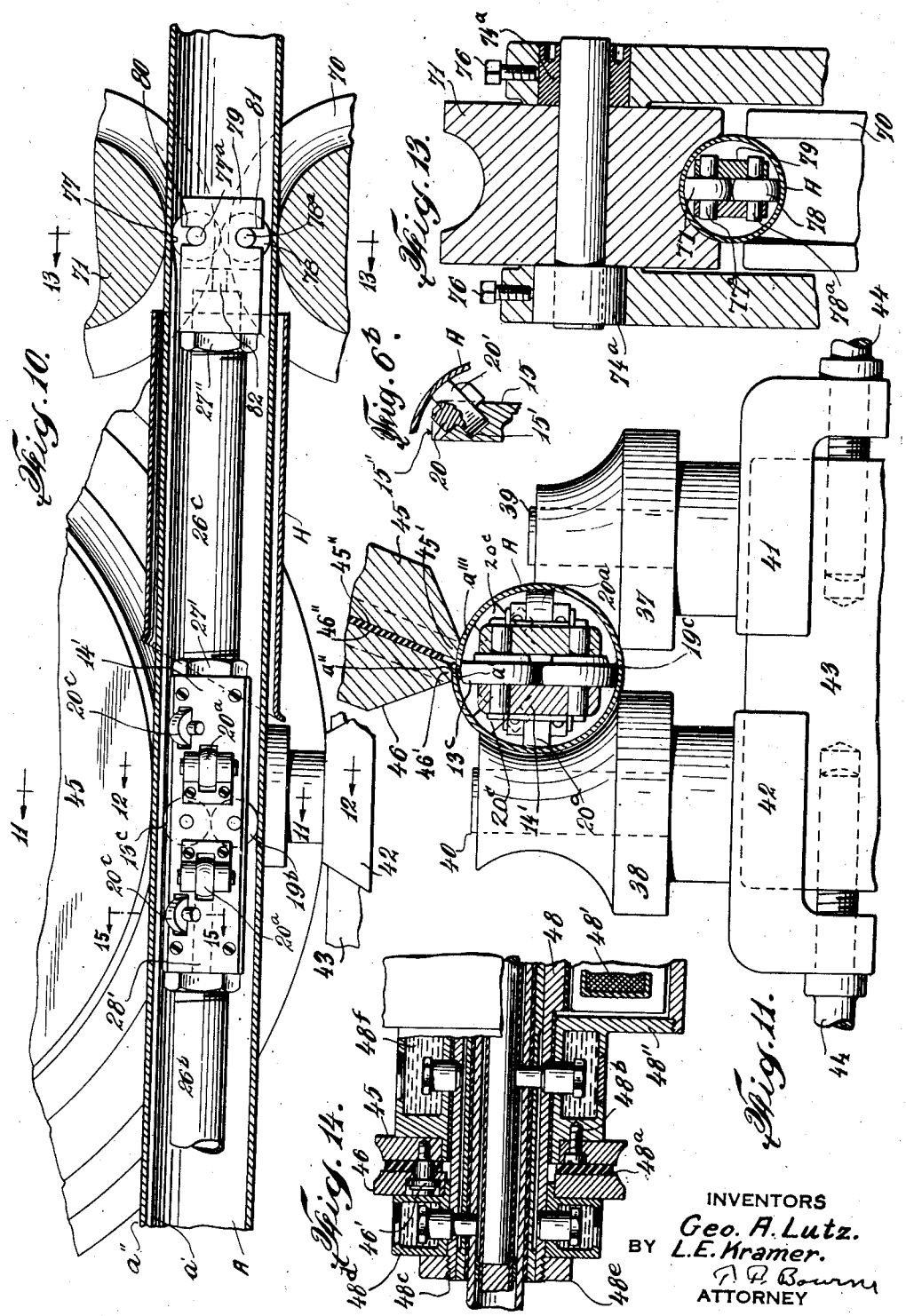

Patented Apr. 25, 1933

1,905,480

UNITED STATES PATENT OFFICE

GEORGE A. LUTZ AND LOUIS E. KRAMER, OF CRANFORD, NEW JERSEY, ASSIGNORS TO AMERICAN CIRCULAR LOOM COMPANY, INC., OF DOVER, DELAWARE, A CORPORATION OF DELAWARE

MEANS FOR ELECTRIC WELDING

Application filed December 1, 1930. Serial No. 499,278.

Our invention relates to improvements in the art of electric welding, and has particular reference to welding the over-lapped marginal portions of a tubular metal blank to produce a lap-weld. When rotative electrodes of different diameters are united together and rotated in contact with portions of a tubular metal blank adjacent to the lapped marginal portions thereof greater wear on the periphery of the electrode of greater diameter occurs than on the periphery of the other electrode, due to the difference in surface speed of such electrodes because the portions of the tubular blank with which the respective electrodes are in rotative contact are of different diameter.

An object of our invention is to utilize for lap-welding a pair of electrodes of substantially similar diameter at tube blank contact surfaces adjacent to the lap and united together for simultaneous rotation and so positioned with relation to a tubular metal blank as to respectively rotate at substantially the same surface speed in contact with corresponding portions of the metal blank adjacent to the lapped marginal portions thereof, notwithstanding the difference in radius of such portions of the blank with which the electrodes contact, whereby wear on the electrodes due to rotation thereof in contact with the metal blank will be substantially uniform.

In carrying out our invention we provide means to support and guide a tubular metal blank having overlapped marginal portions, a pair of annular rotative electrodes adapted to contact with the metal blank adjacent to the over-lapped portions thereof, said electrodes being substantially of equal diameter at their contact surfaces adjacent to the lapped portions and disposed at an angle oblique to a plane through the axis of the blank and the lapped portions of the blank, whereby during traverse of the blank in contact with the electrodes the latter will rotate together with substantially similar surface speeds in contact with the respective adjacent portions of the blank, notwithstanding the difference in radius of the blank at the contact portions, to avoid as much as possible difference in wear on the surfaces of the electrodes, and means to traverse the metal blank longitudinally with respect to said electrodes.

Our invention also comprises means to adjustably support the electrodes at an angle to the aforesaid plane through the metal blank in such a way as to adjust the angularly disposed electrodes in a desired angular relation to the overlapped portions of the metal blank and also in a direction substantially in a parallel to the said plane.

Our invention also comprises novel details in improvement that will be hereinafter set forth and then pointed out in the claims.

Reference is to be had to the accompanying drawings forming part hereof, wherein Fig. 1 is a plan view of a welding machine embodying our improvements; Fig. 1a is a cross section of a tube blank; Fig. 1b is a detail view partly in section on line 1b, 1b, in Fig. 1; Fig. 2 is a side view of Fig. 1; Fig. 3 is a plan view illustrating the transformer and its supporting and adjusting means; Fig. 3a is a section on line 3a, 3a in Fig. 3; Fig. 3b is a detail side view of Fig. 3a. Fig. 4 is a side view of Fig. 3, partly in section on line 4, 4, in Fig. 5; Fig. 5 is a section on line 5, 5 in Fig. 4; Fig. 6 is an enlarged section, substantially on line 6, 6, in Fig. 1; Fig. 6a is a sectional horizontal detail of part of Fig. 6; Fig. 7 is a partial cross section of Fig. 6; Fig. 7a is a detail of roller 13'; Fig. 7b is a sectional detail of the tube blank; Fig. 8 is an enlarged section on line 8, 8, in Fig. 1; Fig. 9 is a cross section on line 9, 9, in Fig. 8; Fig. 10 is a section substantially on the line 10, 10, in Fig. 1; Fig. 11 is a cross section substantially on the line 11, 11, in Fig. 10; Fig. 12 is a cross section on line 12, 12, in Fig. 10; Fig. 13 is a section on line 13, 13, in Fig. 10; and Fig. 14 is a sectional detail of a portion of the transformer.

Similar numerals of reference indicate corresponding parts in the several views.

The main frame of the machine is indicated at 1, which may be of any suitable construction. At 2 is a support, of any desired construction for the passage of a tubular metal blank A which has an open seam at a, which support may be similar to that set forth in the application of George A. Lutz, Serial No. 446,463 filed April 23, 1930. We have illustrated means for displacing the blank A from a normal circular condition at the seam portion and to overlap the marginal portions of the blank. While any suitable means may be provided for overlapping said marginal portions of the tube blank, we have illustrated means substantially similar to that set forth in the aforesaid application as follows:

A grooved blank-guiding roller is indicated at 6, shown journaled upon a shaft at 7 that is carried by supports 8 on the main frame, (Figs. 1, 1b and 2) upon which roller the tube blank is guided as it proceeds from the support 2. Suitably spaced from the roller 6 is a grooved roller 9, said rollers providing a pass for the tube blank. Roller 9 is secured to a shaft 10 journaled on the support 8. The shafts 7 and 10 are joined by intermeshing gears at 11 and 12 causing rotation of said rollers 6 and 9 together (Fig. 2). Either of said shafts may be driven by any suitable means. The roller 9 is shown provided at its grooved portion with closely adjacent tube-blank engaging surfaces 9a, 9b, of different diameters, providing an annular shoulder or rib 9' between said surfaces (Figs. 1 and 7). As said rollers are rotated in contact with the tube blank the latter will be fed forwardly toward welding devices. The edge of the outer portion a'' of the blank will bear again the shoulder 9' (Fig. 17). The groove of roller 6 and the grooved portion of the roller 9 having the less diameter at 9b may be substantially in the radius of the tube blank from its longitudinal center, whereas the greater radius from that surface 9a is on a different radius from that of the other surface of the roller 9, thereby reducing the area of the pass, with respect to the normal cross sectional area of the tube blank, sufficiently to permit displacement of the marginal portion a' of the blank from its normal circular condition. As the tube blank travels between the rollers 6 and 9 the marginal portion a' of the blank will be gradually displaced or depressed inwardly and will be caused to fold or tuck under the margin a'', by reason of the reduced throat area, as indicated in Fig. 1. To cause the inwardly pressed marginal portion a' of the tube blank to be properly guided, and to prevent said portion from being pressed inwardly too far, we provide means within the tube blank to engage the latter and the edge of the portion a' (Figs. 6 and 7). At 13 is a roller within the blank and opposed to the roller 9, the roller 13 having one portion at 13' of less diameter than the other portion 13a. The portion 13' of the roller is adapted to bear against the inset portion a' of the tube blank (Fig. 7). The roller portion 13a serves as an annular outwardly extending shoulder adapted to engage the radial edge of the marginal portion a' of the tube blank to guide the latter whereby the cooperation of the portions 13' and 13a of roller 13 with the marginal and edge portions of the tube blank keep the latter in desired position at the same time that the shoulder 9' of roller 9 keeps the edge of the portion a'', of the blank in required position. The devices pre-set the edges of the tube blank in overlapped relation. The roller 13 is shown provided with a peripheral projecting portion 13x which may be sharpened at its edge, adapted to press into the inner wall surface of the tube blank to form a longitudinal groove y therein as the blank travels forwardly shown adjacent to the longitudinal edge, (Fig. 7). Said groove will later serve as a guiding means for the tube blank.

The roller 13 is journaled on a frame 14 maintained within the tube blank between the rollers 6 and 9. The frame we have illustrated comprises two side bars 15 of suitable length, spaced apart by blocks 16 that are spaced from each other to provide an opening 17 within which the roller 13 is located, Fig. 6a. The parts 15 and 16 are secured together by means of screws 18. The bars 15 are provided with holes in which the pivots 13b of the roll 13 are journaled. Below the roll 13 is another roll 19 having its pivots 19a journaled in holes in the side bars 15 of frame 14, the roll 19 being adapted to bear against the inner surface of the tube blank, as indicated in Fig. 7, the periphery of roll 19 suitably conforming to the curvature of the blank A. The roll 19 is provided with a peripheral groove 19' receiving the portion 13a of roll 13, and a groove 19'' receiving the portion 13x of said roll, Fig. 7. The relation of the parts is such that as the tube blank A travels between the rollers 6 and 9 the rolls 13 and 19 lying in a plane through the overlapped portions of the blank engage the corresponding inner surfaces of the blank, whereby the compression pressure of the roll 9 upon the marginal portions of the tube blank will be resisted by the rolls 13 and 19 and the roller 6, and the pressure of the projecting portion 13x of the roll 13 against the inner surface of the inset marginal portion of the blank A will cause the aforesaid groove y to be formed longitudinally along the inner surface of the tube. In order to keep the frame 14 in proper position in a lateral direction within the tube blank we provide said frame with horizontally disposed outwardly projecting rolls 20, shown provided with vertically extending pivots 21, (Fig. 6a). The bars 15 are shown provided with radially disposed recesses 22 in which the rolls 20 are received, and said bars also have seats at 23, above and below the recesses 22, in which the pivots 21 are rotatively seated. Straps 24 are secured by screws 25 to the outer sides of the bars 15 in front of the pivots 21, whereby the latter are journaled between the seats 23 and said straps. The rollers 20 are in such position as to engage opposite sides of the inner surface of the tube blank to keep the rolls 13 and 19 in proper position. The frame 14 is also shown provided with rolls 20' extending in a direction between the rolls 13 and 20 at angles oblique to the plane through the rolls 13 and 19 to bear against the inner surface of the tube blank A in opposition to the pressure of roll 9 thereon, (Fig. 7). The rolls 20' operate in recesses 15' in the bars 15 and have pivots 20'' journaled in seats 15' in said bars, (Fig. 6b), whereby said rolls are rotatively supported in inclined positions with respect to a plane through the longitudinal axis and the overlapped portions of the tube blank. The frame 14 is supported within the tube blank by contact of the roller 19 with the latter that rests upon the roller 6, and said frame is guided or retained in position by an arm or bar 26 that is secured in a support 2 and projects therefrom toward said rolls. The bar 26 is shown secured to the frame 14 by means of screw threads and a securing nut 27, whereby the position of said frame may be adjusted longitudinally of the tube blank for registering the rolls 13 and 19 with their axes in the desired vertical plane, substantially in the axes of the rolls 6 and 9, (Fig. 6). By preference the arm 26 is tubular and receives a tube 26' from a source of water supply to furnish water through said arm into the tube blank for cooling the rollers therein. The block 16 is shown provided with a bore 28 through which water may pass into space 17 and thence into the tube blank. The pressure of the rollers 6 and 9 may be varied as desired. The shaft 10 is shown journaled in bearing blocks 10a guided in the supports 8, the blocks being provided with adjusting screws 10b, swiveled in said blocks and operative in caps 10' secured on the supports 8, (Figs. 1 and 1b). Desired pressure of the rollers 9 and 13, on and in a plane through the lapped marginal portions a' and a'' of the blank A, may be effected by adjustment of the screws 10b, whereby a substantially definite or fixed thickness of said lapped portions may be produced, in the nature of a cold-rolling of said portions, as the blank travels toward the heating place.

At 29 and 30 are spaced peripherally grooved guiding rolls, spaced from the rollers 6 and 9, providing a guiding pass for the tube blank having the pre-set lapped marginal portions a', a''. Said rolls have shafts 31 and 32 journaled in supports 33 on the main frame. At least one of said shafts may be adjustable from and toward the tube blank for which purpose I have shown the shaft 32 journaled eccentrically in rotatively adjustable bearing blocks 34 and set in bores 35 in the supports 33 and adapted to be retained in adjusted position by screws 36 (Figs. 2 and 9), whereby desired pressure of the rolls 29 and 30 on the pre-set tube blank may be adjusted and maintained. The roll 30 is shown provided with surfaces 30' and 30'' of different diameters. The greater diameter surface 30' bears against the inset portion of the tube blank and the lesser diameter surface 30'' bears against the normal surface of the tube blank. Between the rolls 29 and 30 a frame 14x is shown, within the tube blank, having rollers to engage said blank, in the manner as described with respect to Figs. 6 and 7, except that the roller 13 is substituted by roller 13y having a projecting portion 13z which enters the longitudinal groove y of the tube blank to guide the latter as it travels forwardly toward the heating place. The tube 26a connects the two frames 14 and 14x within the tube blank.

We have illustrated electric heating means for the overlapped portions of the blank and means within the blank to retain the same in its pre-set form, spaced a suitable distance from the tube blank pre-setting devices described. Guiding means for the tube blank are shown provided at the heating place, comprising grooved rollers 37 and 38 journaled upon pivots 39 and 40 carried by blocks 41 and 42. Said blocks are shown guided for lateral adjustment on a member 43 of the main frame and provided with screws 44 cooperative with the parts 41, 42 and 43 for adjusting said rollers radially as required, (Figs. 2 and 11). Above the rollers 37 and 38 are rotative electrodes 45 and 46, shown having grooved peripheries to engage corresponding portions of the tube blank. Said electrodes are spaced apart, secured together and insulated from each other and may be supplied with electric current in any desired way. We have illustrated said electrodes in connection with a welding machine of the rotary transformer class, such as illustrated in Letters Patent to George A. Lutz, No. 1,549,891 granted August 3, 1926, and in Letters Patent No. 1,478,262, issued December 18, 1923, to Snodgrass and Hunter. At 47 is illustrated a transformer of the rotary secondary type, to the secondary 48 of which transformer the electrodes 45 and 46 are connected with the interposed insulation at 48a. In Fig. 14 the transformer primary is indicated at 48', the electrode 45 being shown secured to the portion 48'' of the secondary by screws at 48b, and the electrode 46 is secured to electrode 45 by screws 46', the electrode 46 being in circuit with the portion 48c of the transformer secondary by means of the cooling chamber 48d in circuit with electrode 46 and the portion 48c and retained by nut 48e. The cooling chamber 48d and the cooling chamber 48f, illustrated in Fig. 14, and the parts associated therewith for supplying cooling fluid for the electrodes are substantially the same as illustrated in the application of George A. Lutz, Serial No. 441,784, filed April 5, 1930. Collector rings B and C of the transformer 47 are adapted to contact with brushes D and E of a supply circuit for the transformer (Figs. 3 and 4). The electrodes have suitably curved contact surfaces adapting said surfaces to properly contact with the adjacent portions of the tube blank A as indicated in Figs. 4 and 11. We have illustrated the curved or grooved contact surfaces of the electrodes 45 and 46 as of such radius that the contact surface 45' of electrode 45 will contact with the adjacent portion of the tube blank whose marginal portion a' is inset, and the contact surface 46' of the electrode 46 is of such diameter as to contact with the normally circular portion of the tube blank at the margin a'', the main diameter of the electrodes being substantially the same through contact surfaces. To cause the tube-blank contacting surfaces of the electrodes to properly conform to and engage the corresponding adjacent inset and normal annular portions of the tube-blank adjacent to its lapped portion, the electrodes are located at an angle oblique to a plane passing through the axis of the tube-blank and through the overlapped marginal portions a' and a'' of the blank, the axes of the electrodes being an angle oblique to said plane, as illustrated in Figs. 4 and 11. The curved contacting surfaces 45' and 46' of the electrodes extend in similar directions, the face 45'' of electrode 45 being of greater diameter than the opposing face 46'' of the electrode 46, whereby the grooved surface 45' of the electrode 45 conforms to and engages the convolutely disposed inset portion of the tube blank and the grooved surface 46' of electrode 46 engages the normal outward annular portion a'' of the blank adjacent to the lapped portion thereof due to the oblique angular relation of the electrodes to the blank. The arrangement is such that undue wear and distortion of either electrode with respect to the other electrode will not occur or will be reduced because of the substantially similar diameters of contact surfaces of the electrodes and substantially similar surface speeds. The electrode diameters will remain such during work, as to reduce the requirement of redressing or reshaping the contact surfaces of one of the electrodes because of undue wear with respect to the other electrode. The space between the electrodes is such that the edge of the outer or overlapped portion a'' of the blank will not engage the electrode 45. The current supplied by the transformer for the electrodes will traverse from one electrode to the other through the metal in contact at the overlapped marginal portions of the tube blank to heat such portions for welding them.

In order to support the transformer and the electrodes in proper relation to the tube blank, and to permit adjustment of the electrodes in various directions with respect to the tube blank, we provide means to raise and lower the transformer and the electrodes and to adjust the same in an angular relation to the tube blank, for overlapped portions of the tube blank, for which purpose we have illustrated the following devices. Spaced supports at 50, upstanding from the main frame 1, carry a vertically adjustable frame 51, which may be secured in set position by means of screws 52 and clamps 53 cooperative with the supports 50, Fig. 3. The frame 51 is provided with a bearing at 54 in which is located a stud 55 extending laterally from a rotative supporting bar 56, from which extend brackets 57 having bearings 58 in which the appropriate end portions of the transformer 47 are journaled for support and to permit rotation of the transformer, (Fig. 3). The bar 56 is shown provided with arcuate grooves 59 that receive correspondingly arcuate guiding projections 60 that extend from the frame 51 for bracing the bar 56 with respect to the stud 55. We provide means, such as gearing, for adjusting the bar 56 angularly with respect to the axis of stud 55 and correspondingly angularly adjusting the transformer and its electrodes with respect to the tube blank A. We have shown the bar 56 provided with a worm segment 61 in mesh with a worm 62 journaled in bearings at 63 carried by the frame 51, said worm being shown provided with a hand wheel 64 for manipulation, (Figs. 3, 4, and 5). The bar 56, and the transformer and electrodes rotatively carried thereby, are located at an angle with respect to a plane through the axis of blank A and its overlapped portions, whereby by rotating the worm 62 the electrodes may be adjusted in angular direction with respect to said plane, and by adjusting the frame 51 up or down the electrodes may be adjusted in a direction parallel to said plane. By means of screws 65 that pass through slots 66 in the arcuate grooves 59 of bar 56 and enter threaded recesses 67 in the bar 51 the arm 56 may be secured in set position, after adjustment by means of the gearing 61 and 62. The supports 50, and thereby the transformer, may be adjusted horizontally in any desired way. We have illustrated the supports 50 as carried by a base 50a slidable in guides 50b on the main frame and adjustable by means of screws 50c. By the means described we are enabled to make accurate adjustment of the electrodes with respect to the lapped portions of the tube blank A and effect the desired pressure of the electrodes against the blank; and by means of the vertical and angular adjustments of the electrodes described we are enabled to set and maintain the electrodes expeditiously in desired relation to the overlapped portions of the tube blank to be heated and welded.

We provide means within the tube blank to bear or abut against the latter in opposition to the pressure thereon of the electrode 46 so as to keep the overlapped marginal portions $a'$, $a''$ of the blank in contact with each other for the passage of current through such portions and between the electrodes. For such purpose we have illustrated a frame and rollers within the tube blank of substantially the same construction as that described regarding frame 14 with the exception of roll $13x$, as illustrated in Figs. 10, 11 and 12. From the frame $14x$ a tubular arm or bar $26b$ is extended forwardly, in the direction of travel of the tube blank, and is connected with a frame $14'$ having a bore $28'$ for admitting water from arm $26b$ into frame $14'$, (Fig. 10). The frame $14'$ is provided with a roller $13c$ shaped to bear against the inner marginal portion $a'$ of the tube blank at a position opposite the overlapped marginal portion $a''$ of the blank, in register with the electrode 46. By preference the roll $13c$ is of such configuration as not to engage the tube blank opposite the electrode 45, and said configuration is such as normally only to engage the tube blank opposite the overlapped portions $a'$ and $a''$ thereof. The frame $14'$ is also provided with a roller $19b$ to bear on the lower portion of the tube blank. Frame $14'$ is also provided with side rollers $20a$ to engage the inner sides of the tube blank in the manner described with respect to the rolls 20.

The frame $14'$ is also shown provided with rolls $20c$ extending in an angular direction between the rolls $13c$ and $20a$ to bear against the inner surfaces of the tube blank A in opposition to the electrodes 45 and 46 thereon, (Figs. 10, 11 and 12). The rolls $20c$ are shown supported rotatively on frame $14'$ in manner described with respect to the rolls $20'$. In Fig. 11 the overlapped portions $a'$ and $a''$ oppose the electrode 46 and the portion $a''$ is pressed in contact therewith by the roll $13c$. The pressure of rolls $13c$ and $20c$ against the blank aids in pressing the latter against both electrodes. As a portion of the tube blank travels between the electrodes and the frame $14x$ the overlapped marginal portions $a'$, $a''$ of the blank will be squeezed firmly together between roll $13c$ and the electrode 46 to make required electric contact between the said portions, with the portion $a''$ in contact wtih said electrode, during which period electric current of suitable amperage will flow between the electrodes across the said overlapped portions of the tube blank to create a welding heat thereat. When the overlapped marginal portions $a'$ and $a''$ of the tube blank are sufficiently heated between the electrode 46 and the roll $13c$ we are enabled to so compress or squeeze said overlapped portions together as to effect a weld therebetween by causing suitable pressure of said electrode and roll against said portions $a'$ and $a''$ of the blank. By having the roll $13c$ normally opposing only the overlapped portions $a'$ and $a''$ of the tube blank we are enabled to compress said portions to a desired degree. It is desirable that the areas of the overlapping portions $a'$ and $a''$ of the tube blank be not more than the combined thickness of said overlapped portions between electrode 46 and roll $13c$ to regulate or confine the welding area to a narrow zone laterally.

At a suitable distance from the welding place, and while the metal is still at a suitable welding temperature, we squeeze or compress the overlapped marginal portions $a'$, $a''$. By utilizing sufficient pressure we reduce the combined thickness of said lapped portions substantially to the gage of the tube blank and form a uniform weld, substantially without burs or extrusions along meeting marginal portions of the blank, as illustrated in Figs. 10 and 13. We have illustrated compressing rollers for the overlapped heated portions of the tube blank, between which rollers said portions are compressed as the tube travels. The tube blank A passes through a throat or pass formed between grooved rollers 70 and 71 which are shown carried by shafts 72 and 73, that are journaled in uprights 74 on frame 1. By preference the roller 71 is adjustable toward and from roller 70, for which purpose we have shown shaft 73 eccentrically journaled in sleeves $74a$ rotatively supported in bearings in the uprights 74 and retained in set position by screws 76.

The area of the throat or pass between the grooved rollers 70 and 71 is substantially that of the cross sectional area of the finished welded tube, and correspondingly greater than the area of the pass between rolls 6 and 9. Within the tube blank are roller means to serve with the roller 71 in compressing or welding down the heated overlapped marginal portions $a'$, $a''$ of the blank. We have shown a roll 77 to engage the inner surface of the blank along the welding line in opposition to the roller 71, and a roll 78 to engage the lower surface of the tube blank in opposition to the roller 70, the distance between the diametrically opposing surfaces of the rolls 71 and 77 being such that the overlapped marginal portions $a'$, $a''$ of the tube blank must be squeezed, such as to reduce them substantially to the gage thickness of the metal of the blank, (Fig. 13). In other words, the space between the opposing contacting portions of the roller 71 and roll 77 may correspond substantially to the gage of the metal of the blank, so that when the overlapped heated marginal portions $a'$, $a''$ of the blank are forced between the roller 71 and the roll 77, such metal will be compressed or squeezed to form a single thickness. During such compressing or squeezing of the metal the walls of the tube blank will expand outwardly, due to the flow of the metal from the overlapped portions, to form the finished welded tube to the desired diameter, since the throat between the rollers 70 and 71 is of greater transverse cross sectional area than the throat between the electrodes and the guiding and supporting rollers 37 and 38. The rolls 77 and 78 are shown retained in position and guided by a head or block 79, shown carried by the tubular arm 26c that is attached to and extends from the frame 14'. The block or head 79 is shown provided with recesses 80 and 81 receiving the pivots 77a and 78a of the rolls 77 and 78, Fig. 10. The tubular arm 26c is shown attached to frame 14' by screw threads and retained by clamping nut 27'. Said arm is also shown attached to the head 79 by screw threads and retained by clamping nut 27'', whereby the position of the rolls 77 and 78 may be adjusted with respect to the rollers 70 and 71. The tubular arm 26c will deliver cooling water to the rollers 77 and 78 through a bore 82 in head 79, Figure 10.

It is desirable to retain the heat at the lap-weld of the tube as much as possible before the ironing or compressing operation on the weld at the rollers 70 and 71. We have shown a tubular shield F surrounding and spaced from the tube A and located between the electrodes and the ironing rollers 70 and 71, through which shield the tube travels. The shield is shown provided with an extension h secured to the upright 74. The shield F serves to minimize radiation of heat from the lap-welded tube, and the heat within the shield resists the entrance of fresh air around the tube within the shield, whereby oxidation at the lap-weld is minimized and a better forging effect of the weld is attained at the compressing or ironing rolls 70 and 71.

Tube feeding rolls are indicated at 83 and 84, carried by shafts 85 and 86 journaled in uprights 87 supported by the main frame. The shafts 85 and 86 are provided with gears 88 and 89 in mesh for rotating said rollers in the same direction in unison. Desired pressure of the grooved rolls 83 and 84 upon the tube may be effected by adjusting the shaft 86 vertically in a manner described with respect to shaft 10. Either of the shafts 85 or 86 may be power driven in any suitable way.

In accordance with our invention the tube blank A, having the open seam a, is fed between the pre-setting rollers 6 and 9, whereupon the marginal portions a', a'' of the blank are offset with respect to one another radially and the portion a' is pushed under the portion a'', in overlapped relation, as in Fig. 7, and the thickness of the lap is determined, the groove y being also formed within the blank. As the tube travels in the direction of arrow x, (Fig. 1), the said overlapped marginal portions are retained in position by the guiding rollers 29 and 30 and the projection 13z of roller 13y enters groove y in the blank to guide the overlapped portions in welding position between the electrodes and said portions and are firmly pressed into contact between the electrode 46 and the roll 13c, whereby the electric current from the secondary of the transformer is caused to flow, with suitable amperage, from one electrode to the other through the overlapped marginal portions of the tube blank to heat said portions to a welding temperature. Said margins are, therefore, heated to the desired fusing or welding degree, and while so heated said margins pass through the shield H to the compressing or ironing rolls 70 and 71 where the heated overlapped margins of the blank are compressed or ironed down to a desired thickness, such as corresponding to the gage of the metal of the blank, and the welded tube is delivered in the desired shape and diameter. The operation is such that the finished tube will be welded at the lapped portion in a smooth way without undesired burs or extrusions of the metal along the previously lapped portions.

Our invention is distinguished from the well known butt-welding of tubes, where the edges of the seams are abutted and so welded which usually produces burs or extrusions of the metal along the seam, both exterior and interior, requiring subsequent removal of the burs to produce a smooth appearing finish at the seam, whereby more or less waste of material has occurred, and cost has increased. In accordance with our invention there is no waste material at a seam because no burs are produced requiring removal of metal extruded during welding, and we produce a more substantial weld than is obtained in the butt-welding referred to.

Having now described our invention what we claim is:—

1. A welding apparatus comprising means to traverse a tubular blank having overlapped marginal portions, a pair of spaced electrodes having a common axis and located in a position to engage the exterior of the blank adjacent to the overlapped portions thereof, means supporting said electrodes parallel in planes at an angle oblique to a plane passing through the longitudinal axis and the overlapped portions of the blank, and means to supply said electrodes with electric current.

2. A welding apparatus as set forth in claim 1 provided with means to vary the angular position of said electrodes with respect to said plane through the axis of the blank.

3. An apparatus as set forth in claim 1 provided with means to vary the angular position of said electrodes with respect to said plane through the axis of the blank, and means to adjust said electrodes in the direction of said plane.

4. A welding apparatus comprising means to guide a tubular blank having overlapped marginal portions, a transformer having spaced electrodes, and means supporting said transformer with its axis in a plane oblique to a plane passing through the longitudinal axis of the blank and its overlapped portions with the electrodes in planes oblique to the last named plane, and means to traverse the tube longitudinally with respect to said electrodes.

5. A welding apparatus as set forth in claim 4 provided with means pivotally supporting said transformer and electrodes for adjustment in angular relation to the plane through the axis of the blank.

6. A welding apparatus as set forth in claim 4 provided with means to adjust said transformer and electrodes in angular relation to the plane through the axis of the blank, and means to adjust the transformer and the electrodes in the direction of said plane.

7. A welding apparatus comprising means to guide a tubular metal blank, a transformer provided with spaced electrodes, means pivotally supporting the transformer at a position between its ends and in a direction transverse to the longitudinal axis of the transformer for adjustment of the electrodes with respect to the tube blank, and means to retain the transformer in set position.

8. A welding apparatus as set forth in claim 7 provided with means to permit the transformer bodily to be adjusted in a direction parallel to a plane through the longitudinal axis of the blank at an angle to its longitudinal axis.

9. A welding machine comprising a frame, a bar pivotally carried by said frame, a transformer rotatively carried by said bar and provided with spaced electrodes, means for guiding a metal blank in contact with said electrodes, and means for retaining said bar in set position, whereby the transformer and the electrodes may be adjusted angularly with respect to said blank.

10. A welding machine as set forth in claim 9 in which the means for retaining said bar include gearing between the bar and the frame whereby the bar may be adjusted relatively to the frame and be retained in set position.

11. A welding apparatus comprising uprights, a frame disposed between the uprights, means to secure the frame to the uprights in different elevated positions, a bar pivotally supported by said frame, said bar having bearings, a transformer journaled in said bearings and provided with spaced electrodes, means to retain said bar in angular relation to the frame, and means to guide and traverse a metal blank in contact with said electrodes.

12. A welding apparatus comprising means to feed a tubular metal blank having overlapped marginal portions, a frame within said blank, opposed rollers carried by said frame and bearing against one another and against the blank in a plane through the overlapped portions, a pair of spaced electrodes, one only of said electrodes being in register with and opposed to said rollers and spaced therefrom to receive the overlapped portions of the blank between said electrodes and said rollers, said rollers being so spaced from the other electrode as to prevent engagement of the adjacent roller with the blank in opposition to said other electrode, other rollers carried by said frame and opposing the blank in planes at oblique angles to said plane, and spaced rollers exterior to the blank forming a pass for the latter in opposition to the first named rollers.

13. A welding apparatus comprising means to feed a tubular metal blank having overlapped marginal portions, a frame within the blank, a roller carried by said frame having a portion to form a longitudinal groove in the inner surface of the blank as the latter travels, and a roller exterior to the blank and located in opposition to the first named roller to press the blank against the latter.

14. A welding apparatus as set forth in claim 13, in which the first named roller is provided with a projecting portion to bear against the inner edge of the blank as the latter travels.

15. A welding apparatus comprising means to feed a tubular metal blank having overlapped marginal portions, a frame within the blank, and a roller carried by said frame and provided with a portion to enter a longitudinal groove within the inner surface of the blank to guide the latter as it travels longitudinally.

16. A welding apparatus comprising means to feed a tubular metal blank having overlapped marginal portions, means to heat said overlapped portions to a welding heat, means spaced from said heating means to compress the heated overlapped portions of the blank, and means enclosing the welded tube separate from the heating means and spaced therefrom, said enclosing means being located between the heating and the compressing means to minimize radiation of heat therefrom and oxidation of the weld as the heated portion of the tube passes from the heating means.

17. A welding apparatus comprising means to feed a tubular metal blank having overlapped marginal portions, means to heat said overlapped portions to a welding heat, means spaced from said heating means to compress the heated overlapped portions of the blank, and means located between the heating and the compressing means and enclosing the welded tube to minimize radiation of heat therefrom and oxidation of the weld, the means enclosing the welded tube including a tubular metal shield spaced from the tube.

18. A welding apparatus comprising means to feed a tubular metal blank having meeting portions, means to heat said meeting portions to a welding heat, means spaced from said heating means to compress the heated meeting portions of the blank, and means enclosing the welded tube separate from the heating means and spaced therefrom, said enclosing means being located between the heating means and the compressing means to minimize radiation of heat therefrom and oxidation of the weld.

GEORGE A. LUTZ.
LOUIS E. KRAMER.